United States Patent
Lee

(10) Patent No.: US 8,643,603 B2
(45) Date of Patent: Feb. 4, 2014

(54) KEY PAD AND KEY PAD ASSEMBLY

(75) Inventor: Joo-Hoon Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 568 days.

(21) Appl. No.: 12/684,394

(22) Filed: Jan. 8, 2010

(65) Prior Publication Data

US 2010/0171705 A1   Jul. 8, 2010

(30) Foreign Application Priority Data

Jan. 8, 2009   (KR) .................. 10-2009-0001537

(51) Int. Cl.
*G06F 3/02* (2006.01)

(52) U.S. Cl.
USPC ......................................... 345/168; 345/169

(58) Field of Classification Search
USPC .................... 345/168–172, 105–107
See application file for complete search history.

(56) References Cited

U.S. PATENT DOCUMENTS

| | | | |
|---|---|---|---|
| 6,926,418 B2 * | 8/2005 | Osterg.ang.rd et al. | 362/24 |
| 7,053,799 B2 | 5/2006 | Yu et al. | |
| 7,932,890 B2 * | 4/2011 | Onikiri et al. | 345/102 |
| 2003/0058223 A1 * | 3/2003 | Tracy et al. | 345/169 |
| 2005/0056531 A1 * | 3/2005 | Yu et al. | 200/310 |
| 2007/0140095 A1 * | 6/2007 | Rast | 369/275.2 |
| 2008/0179173 A1 * | 7/2008 | Jung et al. | 200/314 |
| 2008/0316180 A1 * | 12/2008 | Carmody et al. | 345/172 |
| 2009/0035536 A1 * | 2/2009 | Tanaka et al. | 428/195.1 |
| 2009/0051750 A1 * | 2/2009 | Jung et al. | 347/110 |
| 2009/0051846 A1 * | 2/2009 | Horiuchi et al. | 349/58 |
| 2009/0051851 A1 * | 2/2009 | Horiuchi et al. | 349/64 |
| 2009/0059618 A1 * | 3/2009 | Onikiri et al. | 362/603 |
| 2010/0149098 A1 * | 6/2010 | Lasarov et al. | 345/168 |
| 2010/0149104 A1 * | 6/2010 | Sim et al. | 345/169 |

FOREIGN PATENT DOCUMENTS

KR   1020080006920   1/2008

* cited by examiner

*Primary Examiner* — Alexander Eisen
*Assistant Examiner* — Nelson Lam
(74) *Attorney, Agent, or Firm* — The Farrell Law Firm, P.C.

(57) ABSTRACT

Disclosed are a keypad and a keypad assembly for providing increased flexibility. The disclosed keypad includes a base film having button parts formed on the base film, a light guide layer into which light is guided, and electronic paper which is illuminated by light emitted from the light guide layer, and displays at least one symbol, wherein the electronic paper includes metal areas corresponding to the button parts and non-metal areas disposed between the metal areas so as to provide flexibility for the electronic paper. The flexibility of the electronic paper, which can be achieved by the keypad and the keypad assembly, improves the click-feeling to a user when the button parts are pressed.

16 Claims, 5 Drawing Sheets

KEY PAD AND KEY PAD ASSEMBLY

PRIORITY

This application claims priority to an application entitled "Keypad and Keypad Assembly" filed with the Korean Intellectual Property Office on Jan. 8, 2009 and assigned Serial No. 10-2009-0001537, the contents of which are incorporated herein by reference.

BACKGROUND OF THE INVENTION

1. Field of the Invention

The present invention relates generally to a keypad and a keypad assembly that can provide increased flexibility.

2. Description of the Related Art

As various types of portable devices are released, user portability of such devices is an increased concern. Also, the development of a digital convergence technology for integrating multiple portable devices into one has resulted in a tendency to integrate multiple functions into a portable wireless terminal.

For example, many recently-released products have a structure in which an MPEG-Layer Audio 3 (MP3) player, a digital camera, and a game device, are integrated into one portable wireless terminal. Integration of each device's own input keys into a keypad assembly of the portable wireless terminal has became a very difficult problem.

Accordingly, for convenience, the mounting of a general QWERTY type keypad arrangement including various input symbols, such as consonants/vowels, alphabetic letters, numbers, special characters, has a tendency to increase. However, since the size is limited due to the slimness and miniaturization of the portable wireless terminal, the number of key tops of the keypad assembly to be mounted must be restricted.

Presently, such a problem is solved by marking several symbols on each key top or by software, but this causes great inconvenience to a user due to low visibility, for example.

To solve this problem, a technology on such a keypad assembly using electronic paper was disclosed in Korean Patent Laid-open Publication No. 2008-006920 entitled "A Keypad And A Keypad Assembly" (dated Jul. 14, 2006) filed by the present assignee.

Also, this technology was disclosed in U.S. Pat. No. 7,053,799 entitled "Keypad with Illumination Structure", to Yu et al.

FIG. 1 illustrates a keypad provided with electronic paper according to the prior art.

Electronic paper 14 is disposed such that the upper surface of the electronic paper faces the lower surface of a light guide layer 13, is illuminated by the light emitted from the light guide layer 13, and displays multiple symbols. Herein, the symbols include consonants/vowels, alphabetic letters, numbers, special characters, icons (e.g. a clock, or a telephone), for example. Each symbol displayed on the electronic paper 14 is shown through a corresponding key top 11. The electronic paper 14 includes a lower electrode layer 14a, an ink layer 14b, and an upper electrode layer 14c having transparence in visible light, which are sequentially layered.

The electronic paper 14 has multiple display areas one-to-one corresponding to the key tops 11, and each of the display areas displays at least one symbol (e.g. 'L' and 'C'). For the display of such a symbol, the lower electrode layer 14a has multiple electrode patterns one-to-one corresponding to the display areas, and each of the electrode patterns includes multiple segments. Also, each of the electrode patterns has the same shape as the corresponding symbol. Voltage is applied to each of the electrode patterns with a segment unit.

For example, a 'C'-shaped electrode pattern has three segments, and displays 'C' or 'L' through the segment-based voltage application.

Otherwise, each of the electrode patterns may include a single segment. When voltage is applied to the lower electrode layer 14a, the ink layer 14b displays a colored or black/white symbol through the movement of particles according to an applied electric field (that is, the electrophoresis). For example, with electrophoretic electronic paper 14 (E ink corporation), microcapsules filled with transparent liquids separately containing white and black particles are disposed between the upper electrode layer and the lower electrode layer, and the application of an electric field to each of the microcapsules displays a black/white pattern. Since the white particles are positively charged, and the black particles are negatively charged, they move in two opposite directions according to the applied electric field. The electronic paper 14 may display a black/white symbol or a colored symbol, which may be implemented by layering a color filter on the ink layer 14b, using colored particles, instead of black/white particles, as particles constituting the ink layer 14b, or using a colored Light Emitting Diode (LED) or Red, Green, Blue (RGB) light emitting diodes as the light emitting device (not shown). The upper electrode layer 14c functions as a common electrode.

However, the above described keypad assembly using the electronic paper has the following problems.

First, the click feeling is of poor quality because the keypad assembly has a structure where a part of the electronic paper 14 directly presses a corresponding switch by a user's pressing on the key top 11.

Second, the repetitive clicks of the key top 11 may cause the deformation or damage of the electronic paper 14.

Since the light emitting device is disposed between a housing and a transparent keypad, it is difficult to inhibit a light leakage phenomenon.

Third, when a large number of light emitting devices are provided to uniformly and brightly illuminate the electronic paper 14, both the power consumption and the production costs increase.

Fourth, on the lower electrode layer 14a of the electronic paper 14, a projection having a predetermined height from the lower electrode layer 14a is formed due to signal lines according to the electrode patterns of the electronic paper 14.

Accordingly, as the key top 11 is pressed, the electronic paper 14 is bent, and thus force is concentrated on the signal lines at the lower surface of the lower electrode layer 14a. When the lower electrode layer 14a is pressed, a deformation or damage of the electronic paper 14 is incurred.

Therefore, a keypad and a keypad assembly, which can provide the flexibility for a flexible reflective display device, such as electronic paper, are required. Also, in order to minimize the flexible reflective display device's deformation or damage caused by repetitive button clicks, a keypad and a keypad assembly, which have improved impact resistance, are required.

SUMMARY OF THE INVENTION

Accordingly, the present invention has been made to solve the above-mentioned problems occurring in the prior art, and the present invention provides a keypad and a keypad assembly, in which the keypad is provided with non-metal areas generated by etching a hard metal layer on a lower electrode layer to achieve flexibility when button parts on a flexible reflective display device, such as electronic paper, are pressed.

Also, the present invention provides a keypad and a keypad assembly which have improved impact resistance by forming a protective dummy layer around signal lines formed on a lower surface of a lower electrode layer of electronic paper so that the deformation or damage of the flexible reflective display device (such as electronic paper) can be inhibited when button clicks are repeatedly performed.

In accordance with the present invention, there is provided a keypad including a base film having button parts formed on the base film, a light guide layer into which light is guided, and electronic paper which is illuminated by light emitted from the light guide layer and displays at least one symbol, wherein the electronic paper includes metal areas corresponding to the button parts and non-metal areas disposed between the metal areas so as to provide flexibility for the electronic paper.

In accordance with the present invention, there is provided a keypad assembly including a base film having button parts formed on the base film, a light guide layer into which light is guided, electronic paper which is illuminated by light emitted from the light guide layer and displays at least one symbol, and a printed circuit board which faces the base film and includes at least one switch, wherein the electronic paper includes metal areas corresponding to the button parts and non-metal areas disposed between the metal areas so as to provide flexibility for the electronic paper.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE EMBODIMENTS

Figure 1:
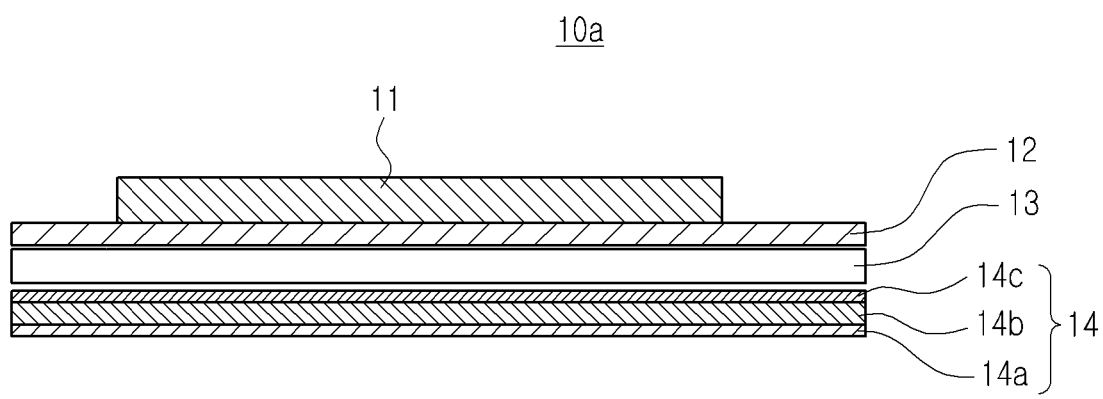
FIG. 1 illustrates a conventional keypad provided with electronic paper.

Hereinafter, embodiments of the present invention will be described in detail with reference to the accompanying drawings. Thus, the embodiments described in the present application and the structure shown in the drawings do not represent all of the technical concepts of the present invention. Various equivalents can replace the embodiments and modifications at the point of fling the present application. Descriptions of well-known functions and parts may be omitted for the sake of clarity and conciseness.

Figure 9:
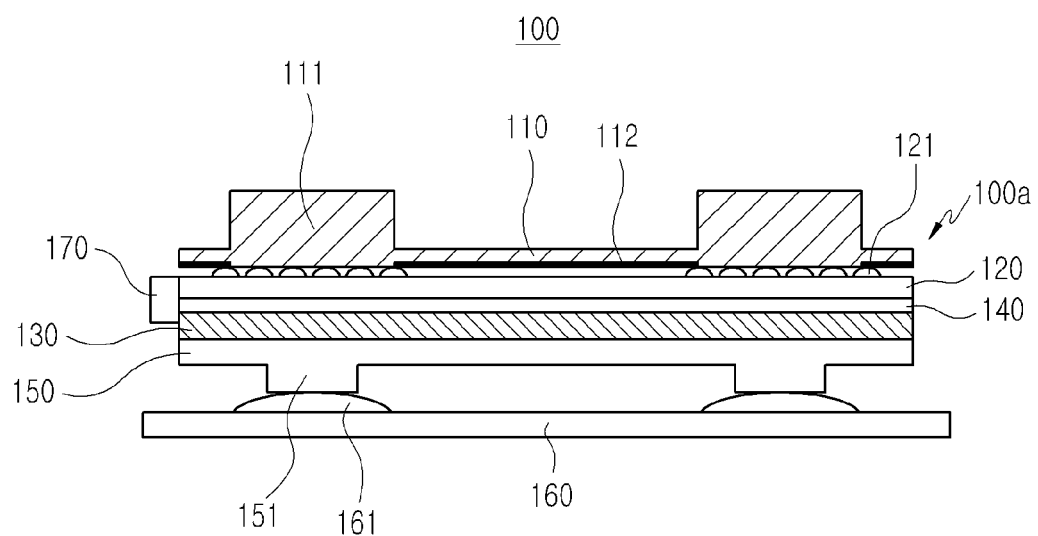
FIG. 9 illustrates a keypad assembly provided with a keypad according to the present invention.

As shown in FIG. 9, a keypad assembly 100 includes a keypad 100a, a printed circuit board 160, and at least one light emitting device 170, which can be mounted within a portable wireless terminal and are disposed facing each other.

Figure 2:
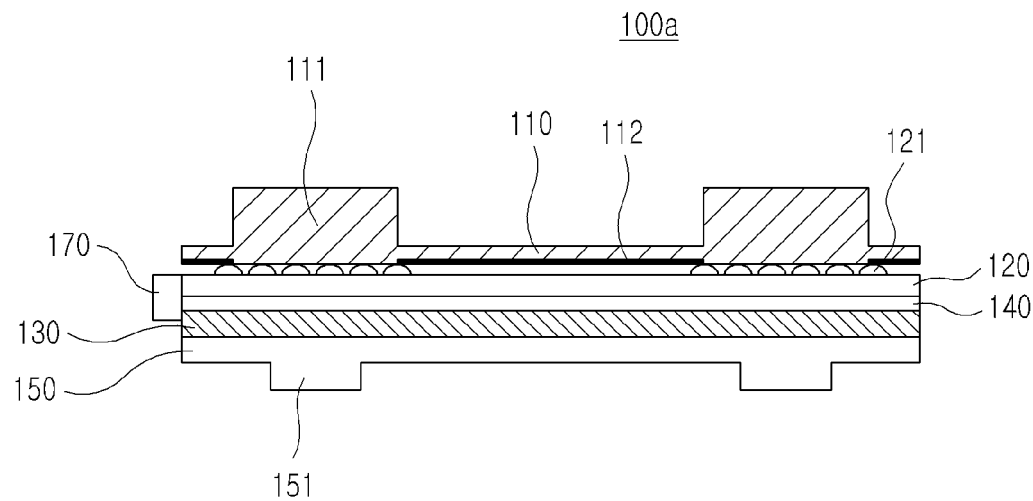
FIG. 2 illustrates a keypad provided with electronic paper, according to the present invention.

As shown in FIG. 2, the keypad 100a according to the present invention includes a base film 110, a light guide layer 120, and electronic paper 130. Button parts 111 are formed on the base film 110. The light guide layer 120 is provided at the lower surface of the base film 110 so that the light emitted from the light emitting device 170 provided at one end of the light guide layer 120 can be guided into the inside.

The electronic paper 130 is provided at the lower surface of the light guide layer 120 so that it can be illuminated by the light emitted from the light guide layer 120, and can display at least one symbol.

A metal layer is etched on the electronic paper 130, between the button parts 111, to provide the flexibility of the electronic paper 130.

As shown in FIGS. 3 to 7, the electronic paper 130 includes an upper electrode layer 130a, a lower electrode layer 130c, and an ink layer 130b. The upper electrode layer 130a functions as a common electrode, and the ink layer 130b is interposed between the upper electrode layer 130a and the lower electrode layer 130c so as to display a symbol according to the electric field generated by the application of voltage to the lower electrode layer 130c. On the lower electrode layer 130c, display portions 131 are formed corresponding to the positions of the button parts 111 so as to display at least one of symbols of the button parts 111. Etched portions 132 in non-metal areas D2 generated by etching the metal layer on the electronic paper 130 are formed between the display portions 131, so as to provide flexibility when the button parts 111 are pressed. That is, the display portions 131 and etched portions 132 are simultaneously generated by etching the metal layer. The etched portions 132 may be filled with a non-metal material.

Figure 3:
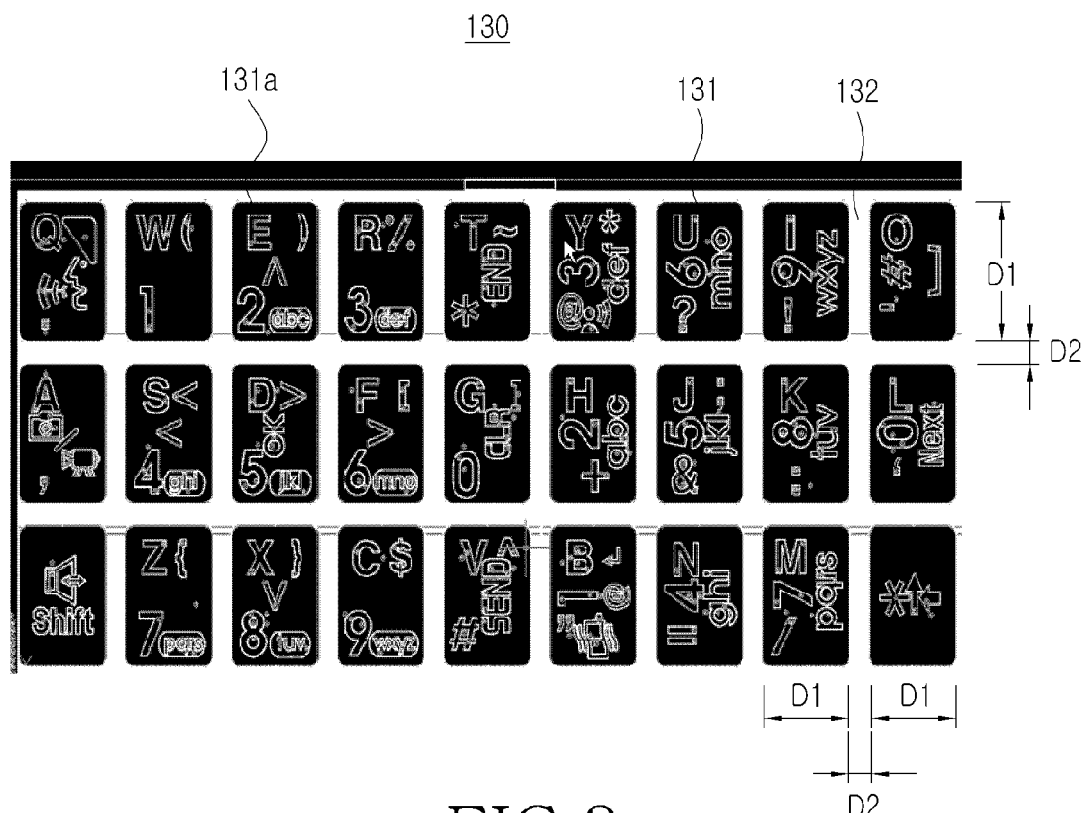
FIG. 3 illustrates display portions having electrode patterns, and etched portions, which are formed on an upper surface of a lower electrode layer in a keypad according to the present invention.
Figure 4:
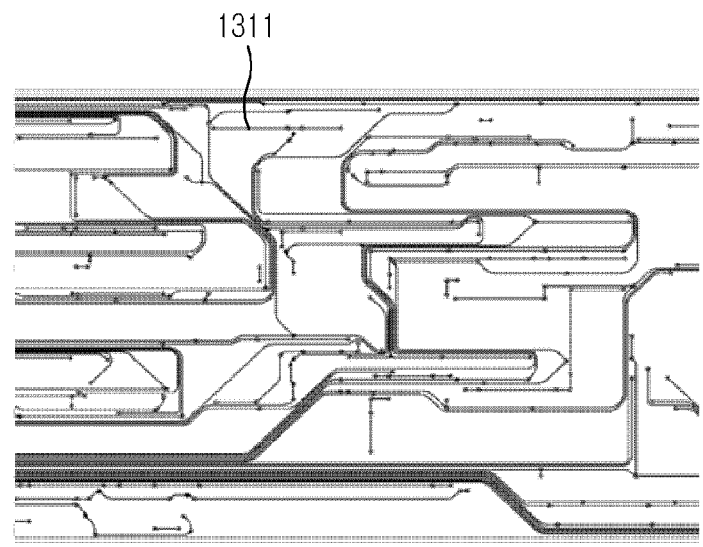
FIG. 4 illustrates signal lines formed on a lower surface of a lower electrode layer in a keypad according to the present invention.
Figure 5:
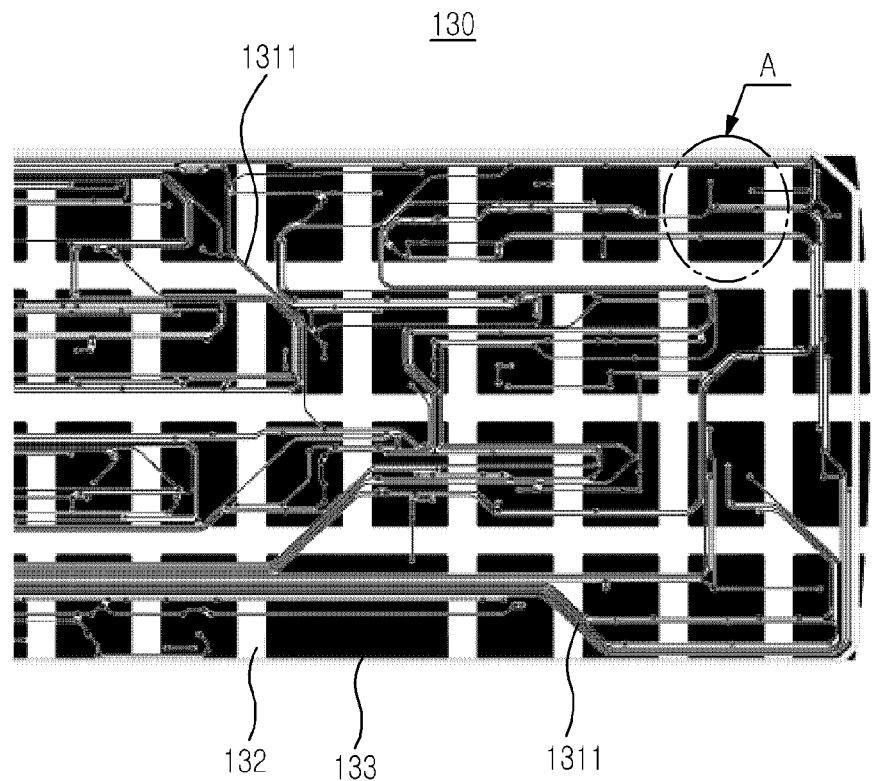
FIG. 5 illustrates the state where a protective dummy layer is provided around signal lines on a lower surface of a lower electrode layer in a keypad according to the present invention.
Figure 6:
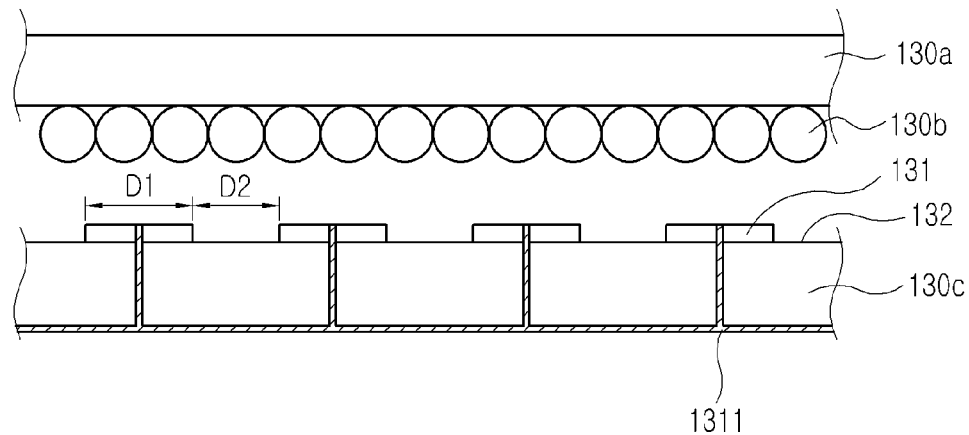
FIG. 6 illustrates signal lines passing through a lower electrode layer of electronic paper in a keypad according to present invention.
Figure 7:
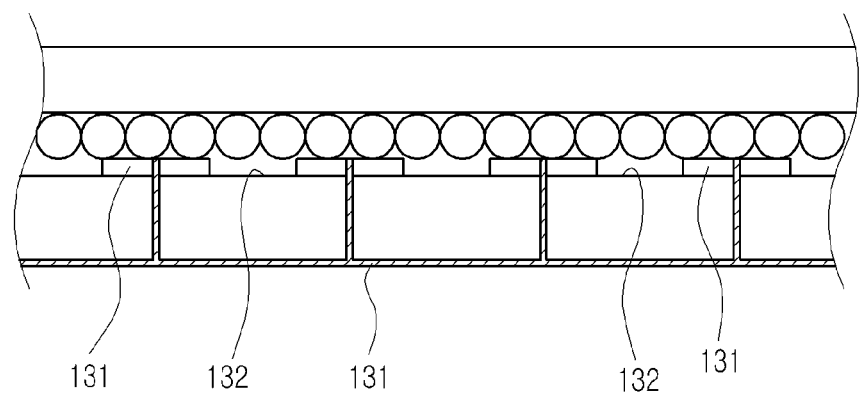
FIG. 7 illustrates a state where the components shown in FIG. 6 are coupled.
Figure 8:
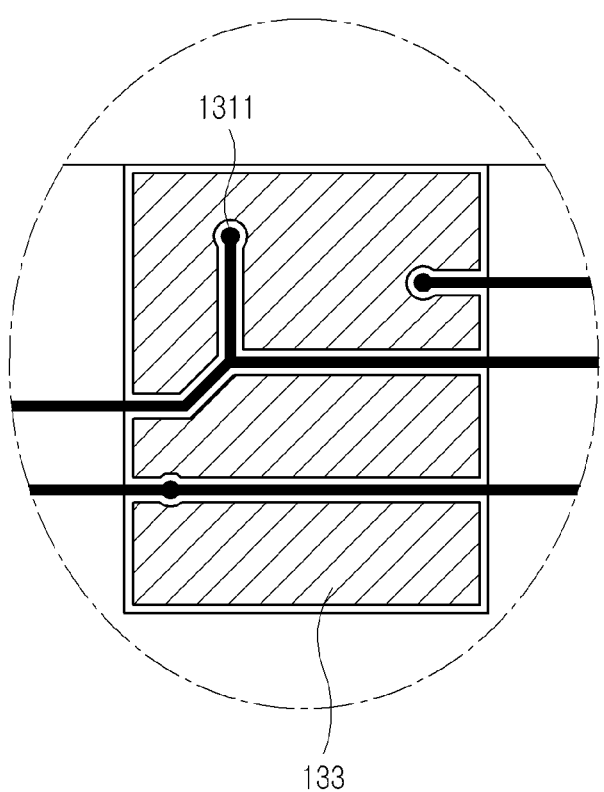
FIG. 8 is an enlarged view of circle A shown in FIG. 5.

As shown in FIGS. 3, 6, and 7, the display portions 131 include the metal areas D1 provided with at least one electrode pattern 131a according to the symbol of the display portions 131. The metal areas D1 correspond to the positions of the button parts 111 while being provided to the lower electrode layer 130c.

As shown in FIGS. 3, 6, and 7, the etched portions 132 are formed between the display portions 131 on the lower electrode layer 130c, which include non-metal areas D2 disposed between the positions of the button parts 111.

As shown in FIGS. 2 to 9, on the base film 110, an opaque-printed layer 112 is formed corresponding to the positions of the etched portions 132 so as to prevent the non-metal areas D2 from being visualized by the etching of the metal layer on the lower electrode layer 130c.

As shown in FIGS. 4 to 7, the display portions 131 are provided with signal lines 1311 electrically connected to the electrode patterns 131a of the display portions 131. Around the signal lines 1311, a protective dummy layer 133 is formed, which is for at least partially planarizing the lower surface of the lower electrode layer 130c to prevent the concentration of force to the electronic paper 130 by the signal lines 1311 when the button parts 111 are pressed.

As shown in FIGS. 2 to 9, the light guide layer 120 includes at least one light extraction pattern 121 which extracts a part of the light guided into the light guide layer 120 toward the outside of the light guide layer 120, thereby causing the part of the light to be incident on the electronic paper 130 and inhibiting the interference between the light guide layer 120 and the base film 110. The light extraction pattern 121 is preferably embossed on the light guide layer 120 so as to inhibit interference between the light guide layer 120 and the base film 110.

As shown in FIGS. 2 to 9, the electronic paper 130 is provided at the lower surface of the light guide layer 120, and between the electronic paper 130 and the light guide layer 120, an optical clear adhesive (OCA) 140 for combining the electronic paper 130 with the light guide layer 120 is tightly formed. Also, on one surface of the electronic paper 130, an elastic pad 150 is provided, and on the lower surface of the elastic pad 150, protrusions 151 are provided correspondingly to the positions of the button parts 111. The elastic pad 150 is provided in such a manner that it can return the protrusions 151 to their original positions after the operation of the protrusions 151.

The light extraction pattern 121 reflect the incident light towards the electronic paper 130. The light extraction pattern 121 may be formed of at least one V-shaped or pyramid-shaped substance. Specifically, on the upper surface of the light guide layer 120 are grooves or prominences-and-depressions having cross-sections that are perpendicular to their longitudinal direction, and having a V-shape or a pyramid shape. When the light extraction pattern 121 is implemented with the V-shaped substances, the V-shaped substances may extend from a first lateral surface of the light guide layer 120 to a second lateral surface that is on the opposite side of the first lateral surface. The V-shaped substances may be in a saw-tooth or slightly deformed saw tooth shape according to a design choice.

If necessary, the light extraction pattern 121 may be formed of engraved grooves in various shapes or a plurality of embossed protrusions on the upper surface of the light guide layer 120. For example, the light extraction pattern 121 may be formed of a plurality of grooves or a plurality of protrusions, each of which may be in various shapes such as a half circle or a triangular pyramid, or a combination thereof. If necessary, the light extraction pattern 121 may be implemented as a reflection or scattering pattern formed by a scratch or a print.

Each of the light extraction patterns 121 is disposed substantially perpendicular below its counterpart button part 111 in order to correspond to the button part 111. The light traveling in the light guide layer 120, through total internal reflection, is incident to the light extraction pattern 121, and most portions of the light reflected or scattered toward the electronic paper 130 by the light extraction pattern 121 do not meet a total internal reflection condition in the inner side of the light guide layer 120. In this case, the light is irradiated toward the electronic paper 130 after passing through the lower surface of the light guide layer 120. The irradiated light is reflected by the electronic paper 130 and then is irradiated outside the light guide layer 120 after passing through the light guide layer 120. Some portion of the light that travels without being reflected or scattered by the light extraction pattern 121 or that is reflected or scattered by the light extraction pattern 121 may continue traveling within the light guide layer 120 while satisfying the total internal reflection condition.

If necessary, the light extracting patterns may be formed on the lower surface of the light guide layer 120. The light extracting patterns refract a portion of the light traveling into the light guide layer 120 towards the outside of the light guide layer 120 in order to cause the extracted portion of the light to be incident to the electronic paper 130.

In this case, the light is irradiated toward the electronic paper 130 after passing through the lower surface of the light guide layer 120 by the light extracting patterns. The irradiated light is reflected by the electronic paper 130 and then is irradiated outside the light guide layer 120 alter passing through the light guide layer 120.

Hereinafter, the operation process of the keypad and the keypad assembly according to the present invention, will be described in more detail with reference to FIGS. 2 to 9.

In the keypad 100a, the button parts 111, the base film 110, the light guide layer 120, the electronic paper 130, the elastic pad 150, and the protrusions 151 are sequentially layered. Also, in the keypad assembly 100 provided with the keypad 100a, the keypad 100 including the button parts 111, the base film 110, the light guide layer 120, the electronic paper 130, the elastic pad 150, and the protrusions 151 protruding from the elastic pad 150 (which are sequentially layered) and the printed circuit board 160 including switches 161 at the lower side of the protrusions 151 are sequentially layered.

The button parts 111 may be integrally or separately provided at the top of the base film 110. In FIGS. 2 and 9, they are integrally provided. The button parts 111, the display portions 131 of the electronic paper 130, the protrusions 151, and the switches 161 are provided at positions corresponding to each other. Also, the light extraction pattern 121 is preferably provided at positions corresponding to the button parts 111, the display portions 131, the protrusions 151, and the switches 161.

Although not shown, the button parts 111 may be adhered to the upper surface of the base film 110 by using an adhesive agent, or may be formed on the base film 110 by using injection molding or Ultra Violet (UV) molding. The button parts 111 may be made of the same material as that of the base film 110, or may be made of polycarbonate or acrylic resin.

In general, the base film 110 may have various shapes, such as a squared plate shape, and includes a plurality of button parts 111 disposed on the upper surface thereof. The base film 110 has elasticity, so that the button parts 111 can return to their original positions after being pressed by a user. The base film 110 may be made of a highly transparent rubber material having low hardness, high elastic deformation capability, high elastic resilience, and high light transmittance, and preferably may be made of a material such as polyurethane or silicone.

On the lower surface of the base film 110, the printed layer 112 is provided, which is opaquely printed by a black color, so as to inhibit light leakage and to prevent the non-metal areas D2 of the electronic paper 130 from being visualized. Although the printed layer 112 is provided on the lower surface of the base film 110 in the drawings according to the present invention, it is possible to form the printed layer on the upper surface of the base film so as to prevent the non-metal areas 1302 from being visualized, or it is possible to add colors so as to further improve aesthetics of the keypad.

Also, although not shown, instead of the printed layer 112, a housing for a portable electronic device may be seated at the upper surface of the base film 110 so as to inhibit light leakage and to prevent the non-metal areas D2 of the electronic paper 130 from being visualized.

The light guide layer 120 may have various shapes, such as a squared plate shape, and its upper surface is disposed facing the lower surface of the base film 110. Also, the light guide layer 120 waveguides the light emitted from the light emitting device 170 formed at one end of the light guide layer 120 toward the inside. The light enters toward the inside of the light guide layer 120 by total reflection at a boundary between the upper or lower surface of the light guide layer 120 and the outside thereof (e.g. an air layer). The light guide layer 120 can return to its original shape after deformation by the pressing of the button parts 111, due to its elasticity (i.e., self-restoration capability). The light guide layer 120 may be made of a material having low hardness, high elastic deformation capability, high elastic resilience, and high light transmittance, and preferably may be made of polycarbonate, polyurethane or silicone.

A plurality of light extraction patterns 121 are formed on the light guide layer 120. The light extraction patterns 121 are preferably provided at the positions corresponding to the button parts 111. The light extraction patterns 121 are preferably embossed on the upper surface of the light guide layer 120 so that the light extraction patterns 121 can extract a part of the light guided into the light guide layer 120 toward the outside of the light guide layer 120, thereby causing the part of the light to be incident on the electronic paper 130 and inhibiting interference between the light guide layer 120 and the base film 110.

The electronic paper 130 is disposed such that its upper surface faces the lower surface of the light guide layer 120. The electronic paper 130 is illuminated by the light emitting from the light guide layer 120, and displays multiple symbols through the button parts 111. The respective symbols displayed by the electronic paper 130 are displayed through the button parts 111.

The electronic paper 130 includes the lower electrode layer 130c, the ink layer 130b, and the upper electrode layer 130a having transparence in visible light and forming a common electrode, which are sequentially layered. Also, the lower electrode layer 130c includes the display portions 131 and the etched portions 132.

The display portions 131 include the metal areas D1, which form the electrode patterns 131a such that they can show symbols one-to-one corresponding to the button parts 111. Each of the electrode patterns 131a shows one symbol. The display portions 131 are provided on the lower electrode layer 130c so that they can be provided at the positions corresponding to the button parts 111. On the lower surface of the display portions 131, the signal lines 1311 for electrically connecting the electrode patterns 131a to each other are provided.

Since the signal lines 1311 are connected through the lower electrode layer 130c while connecting the electrode patterns 131a to each other, a force is concentrated on the signal lines 1311 when the button parts 111 are pressed. Accordingly, the concentration of the force toward the signal lines 1311 may cause the deformation or damage of the electronic paper 130. To avoid this problem, the protective dummy layer 133 for planarizing the lower surface of the lower electrode layer 130c is preferably provided around the signal lines 1311.

The protective dummy layer 133 is provided to prevent the concentration of the force toward the signal lines 1311 when the button parts 111 are pressed, and thus is preferably formed on the lower surface of the lower electrode layer 130c correspondingly to the positions of the button parts 111.

Between the display portions 131, the etched portions 132 generated by etching a metal layer are formed. The etched portions 132 include the non-metal areas D2 remaining after the etching of the metal layer. The etched portions 132, formed between the button parts 111 through the etching of the metal layer, allows the electronic paper 130 to be flexibly deformed by the non-metal areas D2 when a user presses the button parts 111.

In other words, when the button parts 111 are pressed, the flexibility is secured by the non-metal areas D2. Accordingly, when the electronic paper 130 is bent, the bendability and the restoration capability is improved. Also, the touch felt by a user is improved when the user presses the button parts 111. As the button parts 111 are pressed, also pressed are the light guide layer 120, the display portions 131, and the elastic pad 150, which correspond to the positions of the button parts 111. The non-metal areas D2 formed around the display portions 131 are flexibly changed, and then are returned to their original state.

The elastic pad 150 is provided on the lower surface of the electronic paper 130, and the protrusions 151 protruding correspondingly to the positions of the button parts 111 are provided on the elastic pad 150.

The keypad assembly 100 also includes the printed circuit board 160 facing the elastic pad 150, and one or more switches 161 engaging with the protrusions 151, at positions corresponding to the button parts 111.

Although not shown, each of the switches 161 includes multiple conductive contact members formed on the upper surface of the printed circuit board 160, and a dome formed at the printed circuit board 160 to cover the conductive contact members.

When the user presses the required button parts 111, the display portions 131 are flexibly deformed by the etched portions 132, and the keypad 100a's components disposed under the button parts 111 are pushed toward the switch 161 of the printed circuit board 160. Since the non-metal areas 132 are provided around the display portions 131 so as to provide flexibility, the display portions 131 can be easily returned toward the button parts 111. This improves a click-feeling of satisfaction as well as a sense of stability when a user clicks the button parts 111.

The protrusion 151 included in the pushed components presses the switch 161, and the pressed dome electrically connects to the corresponding contact member, which allows the switch 161 to turn on/off.

Between the lower surface of the light guide layer 120 and the upper surface of the electronic paper 130, the OCA 140 for adhering the light guide layer 120 to the electronic paper 130 is tightly formed. The OCA 140 preferably has a lower refractive index than that of the light guide layer 120.

The hard metal layer formed on the lower electrode layer of the electronic paper is partially removed so as to provide the non-metal areas 132 between the metal areas formed at positions corresponding to the button parts. Thus, when the button parts are pressed, the electronic paper can be easily deformed, and the soft click-feeling can be achieved.

Also, in order to prevent the etched portions of the non-metal areas from coming within a user's field of vision, the opaque-printed layer is formed on the base film, which can highly increase a user's satisfaction by improving the aesthetics of the keypad.

As described above, the keypad and the keypad assembly according to the present invention include the etched portions which have non-metal areas remaining after the partial removal of the hardest metal layer provided on the electronic paper, between button parts. Thus, it is possible to secure the flexibility of the electronic paper, between the button parts.

In order to cover the positions of the non-metal areas which can be visualized by the partial removal of the hardest metal layer, a printed layer is provided, to improve aesthetics of the keypad assembly.

At the lower surface of the lower electrode layer of the electronic paper, the protective dummy layer is provided around the signal lines so that the lower surface of the lower electrode layer can be at least partially planarized. This can prevent the concentration of a force toward the signal lines, and the damage or deformation of the electronic paper, which is caused by the concentration of the force.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A keypad comprising:
a base film having button parts formed on the base film;
a light guide layer into which light is guided; and
electronic paper which is illuminated by light emitted from the light guide layer, and displays at least one symbol,
wherein the electronic paper includes an upper electrode layer, a lower electrode layer, and an ink layer which is interposed between the upper electrode layer and the lower electrode layer and displays a symbol according to an electric field generated by application of voltage to the lower electrode layer,
wherein the electronic paper further includes metal areas corresponding to the button parts and non-metal areas disposed between the metal areas so as to provide flexibility for the electronic paper, such that the metal areas and the non-metal areas are formed as a single layer directly disposed on an upper surface of the lower electrode layer, and the non-metal areas are not holes passing through the electronic paper, and
wherein signal lines are directly disposed on a lower surface of the lower electrode layer, such that the signal lines pass through the lower electrode layer and are electrically connected to the metal areas disposed on the upper surface of the lower electrode layer, and a protective dummy layer is directly disposed on the lower surface of the lower electrode layer around the signal lines, such that the disposition of the protective dummy layer inhibits concentration of a force towards the signal lines by the electronic paper when the button parts are pressed.

2. The keypad as claimed in claim 1, wherein on the lower electrode layer, display portions are provided corresponding to positions of the button parts so as to display at least one of symbols of the button parts, and
between the display portions, etched portions generated by etching a metal layer on the electronic paper are provided to implement flexibility when the button parts are pressed.

3. The keypad as claimed in claim 2, wherein the display portions comprise the metal areas provided with one or more electrode patterns according to symbols of the display portions.

4. The keypad as claimed in claim 2, wherein the etched portions are formed between the display portions, and comprise the non-metal areas.

5. The keypad as claimed in claim 1, wherein an opaque-printed layer for preventing the non-metal areas from being visualized is formed on the base film.

6. The keypad as claimed in claim 1, wherein the light guide layer comprises one or more light extraction patterns which extract a part of the light guided into the light guide layer toward outside of the light guide layer, thereby causing the part of the light to be incident on the electronic paper.

7. The keypad as claimed in claim 1, wherein the electronic paper is provided at a lower surface of the light guide layer, and an optical clear adhesive for combining the electronic paper with the light guide layer is tightly formed between the electronic paper and the light guide layer.

8. The keypad as claimed in claim 1, wherein on one surface of the electronic paper, an elastic pad is provided, and on a lower surface of the elastic pad, protrusions are provided correspondingly to positions of the button parts, wherein the elastic pad returns the protrusions to an original position after operation of the protrusions.

9. A keypad assembly comprising:
a base film having button parts formed on the base film;
a light guide layer into which light is guided;
electronic paper which is illuminated by light emitted from the light guide layer, and displays at least one symbol; and
a printed circuit board which faces the base film and comprises at least one switch,
wherein the electronic paper includes an upper electrode layer, a lower electrode layer, and an ink layer which is interposed between the upper electrode layer and the lower electrode layer and displays a symbol according to an electric field generated by application of voltage to the lower electrode layer,
wherein the electronic paper further includes metal areas corresponding to the button parts and non-metal areas disposed between the metal areas so as to provide flexibility for the electronic paper, such that the metal areas and the non-metal areas are formed a single layer directly disposed on an upper surface of the lower electrode layer, and the non-metal areas are not holes passing through the electronic paper, and,
wherein signal lines are directly disposed on a lower surface of the lower electrode layer, such that the signal lines pass through the lower electrode layer and are electrically connected to the metal areas disposed on the upper surface of the lower electrode layer, and a protective dummy layer is directly disposed on the lower surface of the lower electrode layer around the signal lines, such that the disposition of the protective dummy layer inhibits concentration of a force towards the signal lines by the electronic paper when the button parts are pressed.

10. The keypad assembly as claimed in claim 9, wherein on the lower electrode layer, display portions are provided corresponding to positions of the button parts so as to display at least one of symbols of the button parts, and
between the display portions, etched portions generated by etching a metal layer on the electronic paper are provided to implement flexibility when the button parts are pressed.

11. The keypad assembly as claimed in claim 10, wherein the display portions comprise the metal areas provided with one or more electrode patterns according to symbols of the display portions.

12. The keypad assembly as claimed in claim 10, wherein the etched portions are formed between the display portions, and comprise the non-metal areas.

13. The keypad assembly as claimed in claim 9, wherein an opaque-printed layer for preventing the non-metal areas from being visualized is formed on the base film.

14. The keypad assembly as claimed in claim 9, wherein the light guide layer comprises one or more light extraction patterns which extract a part of the light guided into the light guide layer toward outside of the light guide layer, thereby causing the part of the light to be incident on the electronic paper.

15. The keypad assembly as claimed in claim 9, wherein the electronic paper is provided at a lower surface of the light guide layer, and an optical clear adhesive for combining the electronic paper with the light guide layer is tightly formed between the electronic paper and the light guide layer.

16. The keypad assembly as claimed in claim 9, wherein an elastic pad is provided on one surface of the electronic paper, and on a lower surface of the elastic pad, protrusions are provided correspondingly to positions of the button parts, wherein the elastic pad returns the protrusions to an original position after operation of the protrusions.

* * * * *